United States Patent
Huellenkremer et al.

(10) Patent No.: US 10,151,587 B2
(45) Date of Patent: Dec. 11, 2018

(54) METHOD AND DEVICE FOR DETERMINING NAVIGATION DATA

(71) Applicant: NORTHROP GRUMMAN LITEF GMBH, Freiburg (DE)

(72) Inventors: Manfred Huellenkremer, Freiburg (DE); Manfred Krings, March (DE)

(73) Assignee: NORTHROP GRUMMAN LITEF GmbH (DE)

( * ) Notice: Subject to any disclaimer, the term of this patent is extended or adjusted under 35 U.S.C. 154(b) by 139 days.

(21) Appl. No.: 15/124,548

(22) PCT Filed: Mar. 6, 2015

(86) PCT No.: PCT/EP2015/000507
§ 371 (c)(1),
(2) Date: Sep. 8, 2016

(87) PCT Pub. No.: WO2015/135638
PCT Pub. Date: Sep. 17, 2015

(65) Prior Publication Data
US 2017/0016729 A1    Jan. 19, 2017

(30) Foreign Application Priority Data
Mar. 10, 2014    (DE) .......................... 10 2014 004 060

(51) Int. Cl.
G01C 21/16       (2006.01)
G01C 21/20       (2006.01)
(Continued)

(52) U.S. Cl.
CPC ............ *G01C 21/165* (2013.01); *G01C 21/20* (2013.01); *G01C 21/28* (2013.01); *G01S 19/47* (2013.01)

(58) Field of Classification Search
CPC ...... G01C 21/165; G01C 21/20; G01C 21/28; G01S 19/47
See application file for complete search history.

(56) References Cited

U.S. PATENT DOCUMENTS 6,332,103 B1    12/2001  Steenson, Jr. et al.
6,647,352 B1 *  11/2003  Horton .................. G01C 21/16
                                                                   702/151
(Continued)

FOREIGN PATENT DOCUMENTS

| JP | 2012-068189 A | 4/2012 |
| RU | 2442962 C2 | 2/2012 |
| WO | 20100062179 A1 | 6/2010 |

OTHER PUBLICATIONS

Decision to Grant a Patent for an Invention for corresponding Russian application No. 2016131499/28, dated Dec. 1, 2017, with English translation.
(Continued)

*Primary Examiner* — Thomas G Black
*Assistant Examiner* — Sze-Hon Kong
(74) *Attorney, Agent, or Firm* — Tarolli, Sundheim, Covell & Tummino LLP

(57) ABSTRACT

In a method for determining navigation data, positional angle measurement values are determined using a first navigation device (310). A second navigation device (320) is then initialized using the positional angle measurement values determined by the first navigation device (310). Both navigation devices are supplied with rotational rate and acceleration measurement values from a common sensor unit in order to determine the positional angle measurement values. In the process, the first navigation device (310) produces erroneous measurements of the positional angle measurement values with a probability which is lower than as specified positional angle error rate, and the second
(Continued)

Figure 1A:
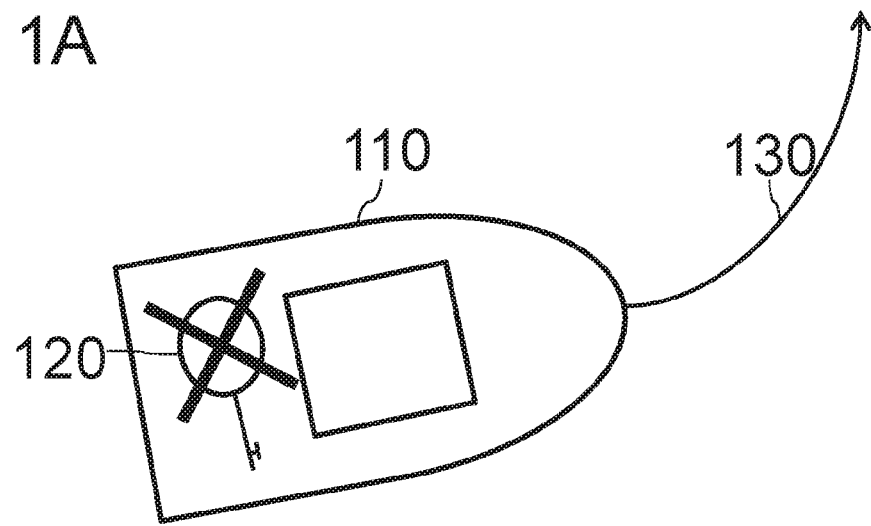

navigation device (320) produces erroneous measurements of the positional angle measurement values with a probability which is higher than the specified positional angle error rate. An erroneous measurement of the positional angle measurement values is present if one of the determined positional angle measurement values deviates from a corresponding positional angle reference value by more than a specified positional angle tolerance value.

11 Claims, 4 Drawing Sheets

(51) Int. Cl.
    *G01C 21/28*      (2006.01)
    *G01S 19/47*      (2010.01)

(56) References Cited

U.S. PATENT DOCUMENTS

| | | |
|---|---|---|
| 6,944,542 B1 | 9/2005 | Eschenbach |
| 6,961,643 B1 | 11/2005 | Younkin et al. |
| 7,522,985 B2 | 4/2009 | Fiedler et al. |
| 7,677,076 B2 | 3/2010 | Takeno |
| 7,881,861 B2 | 2/2011 | Kravets et al. |
| 8,494,764 B2 | 7/2013 | Lappe et al. |
| 2001/0020216 A1 | 9/2001 | Lin |
| 2002/0116993 A1 | 8/2002 | Patouraux |
| 2014/0074397 A1* | 3/2014 | Vanderwerf .......... G01S 19/20 701/472 |
| 2014/0121963 A1* | 5/2014 | Buck .................... G01C 21/165 701/501 |
| 2016/0047675 A1* | 2/2016 | Tanenhaus .......... G01C 25/005 702/104 |
| 2017/0016728 A1* | 1/2017 | Sheard ................ G01C 19/025 |
| 2017/0184404 A1* | 6/2017 | Buck .................... G01C 21/165 |

OTHER PUBLICATIONS

International Preliminary Report on Patentability for Application No. PCT/EP2015/00507 dated Aug. 2, 2016.

International Search Report for Application No. PCT/EP2015/000507 dated Jun. 25, 2015.

\* cited by examiner

METHOD AND DEVICE FOR DETERMINING NAVIGATION DATA

RELATED APPLICATIONS

The present invention is a U.S. National Stage under 35 USC 371 patent application, claiming priority to Serial No. PCT/EP2015/000507, filed on 6 Mar. 2015; which claims priority from DE 10 2014 004 060.7, filed 10 Mar. 2014, the entirety of both of which are incorporated herein by reference.

The invention concerns a method for determining navigation data and a device for carrying out the method.

For navigation, in particular in aviation, increased demands are made on the integrity of track and positional angle information. This integrity is achieved by reliable yaw attitude reference systems and by redundant equipment such as multiple installations and emergency instruments.

To increase the accuracy hybrid systems are used that couple an inertial navigation platform and a satellite navigation system via a Kalman filter.

In addition to the accuracy of a specific parameter also its integrity has an important role in aviation. The integrity of the satellite navigation system alone is, however, not sufficient for all applications in aviation. This is in particular then the case, if the satellite navigation system influences the determination of position. If the satellite navigation system is also used in the redundant equipment, the integrity of the satellite navigation system determines substantially the integrity of the whole navigation system. The integrity of satellite navigation system is, however, limited from below. Hence, also the integrity of hybrid systems in a single or in multiple implementations is limited.

Integrity denotes the probability according to which the error of a measurement value, such as e.g. the position, does not exceed a predetermined threshold.

For example, integrity may be determined by the maximally allowed error rate during a reference unit. Here, an erroneous measurement is a measurement, whose measurement values deviates by more than a tolerance value from a reference value. The reference value may be the actual value or a value of the measured quantity based on previous measurements.

The reference unit in respect to which the error rate is determined may be each unit that is suitable for measurements of position or track changes. The reference unit may for example be a time unit, such as e.g. minutes, hours or days. Then, the error rate is determined by dividing the number of transgressions of the predetermined error bound (i.e. the number of erroneous measurements) by the selected time unit. The error rate is then indicated for example as the number of errors per hour. The reference unit may also be a length unit, such as e.g. meter, kilometer, nautical miles. The integrity may then for example be indicated as the number of errors (i.e. number of transgressions of the error bound) per nautical mile. The reference unit may also be an indication of degrees with respect to latitude and longitude on Earth's surface, such as e.g. degree, angular minute, or arc second. The integrity is then for example indicated as number of errors per angular minute.

A high integrity is achieved, if the number of erroneous measurements is very low, for example if erroneous measurements occur considerably more rarely than once in thousand years (this corresponds to an integrity of approximately $10^{-7}$/hour).

For aviation and seafaring in particular the integrity of the role angle and the pitch angle (positional or orientation angles) as well as of the track angle is of importance, as these describe the orientation of watercrafts or aircrafts in space. If, for example the role angle of a watercraft becomes too large, it is endangered to overturn. In addition, in driving a curve, the radius of the driven (or aviated) curve may be estimated from the role angle. If the pitch angle is determined wrongly during approach for landing of an aircraft, a safe landing is endangered.

An erroneous measurement of track or positional angles is present, if a measurement value of one of the angles deviates by more than a tolerance value from the respective reference value. The reference value may be the actual value of the angle or a value of the angle that is interpolated from data measured so far.

According to the position and maneuver of the vehicle the requirements to the frequency of occurrence of allowed erroneous measurements and hence to the integrity may be differently severe. For a watercraft in quiet water on open sea, an aircraft connected firmly to the watercraft or standing on earth, or an aircraft that is in great height the requirements to the integrity are lower than for a watercraft in heavy sea or close to coast or for an aircraft during approach for landing.

Typical tolerance values in aviation are 4° to 5° for deviating of positional angle measurement values from the respective reference values and of about 10° for deviations of track angle measurement values from the respective reference values. Using these tolerance values navigation systems of aircrafts with high integrity should ensure that the probability for transgression of the tolerance values for the positional angle measurements is smaller than $10^{-9}$ per hour (i.e. less than $10^{-9}$ erroneous positional angle measurements per hour or about one erroneous measurement in 100.000 years) or for track angle measurements less than $10^{-7}$ per hour (i.e. less than $10^{-7}$ erroneous track angle measurements per hour or about one erroneous measurement in 1.000 years).

In order to guarantee a high accuracy of the angular measurements in conventional systems, hybrid navigation platforms are used that couple inertial navigation platforms with satellite navigation systems via Kalman filters.

Measurement values of the inertial navigation platform are generated in this process by acceleration sensors and rotation rate sensors. As rotation rate sensors mechanic gyroscopes, fiber optic rotation rate sensors, laser gyroscopes or micro electromechanical rotation rate sensors may be used. Nowadays often micromechanical sensors are used as acceleration sensors. Here, during system initialization reference is made to Earth's rotation rate and the direction of gravitation, in particular for determining the track angle. The horizontal component of Earth's rotation rate that has to be determined for this process becomes, however, smaller with increasing geographical latitude, i.e. towards the pols track determination becomes increasingly less accurate.

The satellite navigation system may be the global position system (GPS) or any other satellite navigation system, such as Galileo, GLONASS or Compass. The satellite navigation system determines the position and the velocity of vehicles by means of distance measurements to at least four satellites in earth orbit. In "weakly coupled systems" the position and velocity provided by the satellite navigation system is used in a Kalman filter as measurement. In "strongly coupled systems", in contrast, the distances and their changes to the single satellites are used as measurements in the Kalman filter. This allows recognizing and excluding of erroneous satellites and an estimation of error rates and the integrity by exclusion of redundant measurements. However, this requires in comparison with a "weakly coupled system" a considerably larger amount of data processing.

Inertial navigation platforms and the satellite navigation systems transmit the measurement values determined by them to the Kalman filter. Based on the previously obtained satellite measurement values, the Kalman filter estimates corrections for the present orientation/position of the vehicle. To achieve this effect the hybrid navigation platform must, however, be exposed to accelerated movements.

Due to this coupling of an absolute positioning system as constituted by the satellite navigation system with a relative system as constituted by an inertial navigation platform, quickly converging and very accurate orientation and position data can be generated by means of the Kalman filter for dynamical movements of the vehicle continued over a certain time, which exceed the accuracy of purely inertial navigation platforms considerably. In particular, a very accurate determination of the track angle is possible, as the position data do not depend on the geographical latitude, on which the navigation platform is located, in contrast to the measurement values of purely inertial navigation platforms.

However, in this process it is problematic that the obtained highly precise orientation, track, and position accuracies have only the integrity of the satellite navigation system and that for example the orientation/positional angles cannot be determined with the sufficiently high integrity for aviation of $10^{-9}$/h. With $10^{-4}$ per hour (without additional integrity surveillance on ground, such as e.g. SVAS ("Satellite Based Augmentation System"), GBAS ("Ground Based Augmentation System")) and with $10^{-7}$ per hour (with ground surveillance) the integrity of weakly coupled hybrid systems is below the requirements of aviation.

It is, hence, not possible to initialize hybrid navigation platforms by means of weakly coupled satellite navigation system data such that a high integrity can be achieved, as the insufficiently high integrity of the satellite navigation system is transferred into the hybrid navigation platform. Hence, for an aircraft starting e.g. from a watercraft no sufficiently high integrity can be obtained by a conventional hybrid navigation platform.

The invention is therefore concerned with the object to indicate a method and a device for determining navigation data that ensure a high integrity.

This object is solved according to the invention by a method with the features of claim 1 and by a device with the features of the other independent claim.

Advantageous embodiments of the method or the device are indicated in the dependent claims.

A method according to the invention for determining navigation data comprises as steps: Determining positional angle measurement values with a first navigation device and initializing a second navigation device with the positional angle measurement values determined by the first navigation device. In this process, the first navigation device and the second navigation device are provided from a sensor unit with rotation rate and acceleration measurement values for determining the positional angle measurement values. Further, the first navigation device carries out erroneous measurements of positional angle measurement values with a probability that is smaller than a predetermined positional angle error rate. In contrast, the second navigation device carries out erroneous measurements of the positional angle measurement values with a probability that is larger than the predetermined positional angle error rate. Here, an erroneous measurement of the positional angle measurement value is present, if one of the determined positional angle measurement values deviates by more than a predetermined positional angle tolerance value from a respective positional angle reference value.

A device according to the present invention for determining navigation data comprises a first navigation device for determining positional angle measurement values, a second navigation device for determining positional angle measurement values, and a sensor unit that provides rotation rate and acceleration measurement values for determining the positional angle measurement values to the first navigation device and the second navigation device. In this process, the second navigation device is initialized with positional angle measurement values determined by the first navigation device. Further, the first navigation device carriers out erroneous measurements of positional angle measurement values with a probability that is smaller than a predetermined positional angle error rate. In contrast, the second navigation device carries out erroneous measurements of positional angle measurement values with a probability that is larger than the predetermined positional angle error rate. Here, an erroneous measurement of the positional angle measurement value is present, if one of the determined positional angle measurement values deviates by more than a predetermined positional angle tolerance value from a respective positional angle reference value.

This guarantees that the second navigation device is initialized with measurement values that satisfy higher integrity requirements than the second navigation device can provide itself.

Therefore, the high integrity of the first navigation device can be combined with advantageous characteristics (e.g. high measurement accuracy of position and orientation data) of the second navigation device. For example, the first navigation device may be an inertial navigation platform as described above and the second navigation device may be a hybrid navigation platform as described above.

In a scenario according to the invention a helicopter is located on a ship. The aim is to provide after an initialization and orientation phase of the hybrid system track and positional angles with the required accuracy and integrity.

The proposed system comprises thereto a purely inertial navigation platform and a hybrid navigation platform.

First, the inertial system carries out a classical gyro compass alignment. To this end, the system should only carry out such accelerated movements that are mean value free if considered over the period of alignment. The inertial navigation platform is then initialized after completion of the dynamic gyro compass alignment with the track/positional angles obtained in this process. Because of the movement, the achieved accuracy is, however, not sufficient for navigation operation and the system is operated as track/position reference.

Alternatively, the heading alignment (i.e. the track determination) may also be carried out by means of a magnetic sensor (i.e. a compass) or by means of input of the present heading by the pilot. The accuracy and integrity of the heading initialized by this alternative method must be in compliance with the integrity requirements of the application. However, because of the limited accuracy, this method is also not suitable to allow operation of the system in navigation mode.

The hybrid navigation platform is initialized by the track/positional angles of the inertial navigation platform. This ensures that the linear error model implemented in the Kalman filter can be used.

At the time of initializing accuracy and integrity of hybrid and inertial platform are the same.

By means of accelerated movements occurring after the initialization or alignment due to ship maneuvers or aircraft movements the Kalman filter is able to estimate the system errors by using the GPS measurements and to apply them as corrections. This leads to a quick improvement of the accuracy of track/positional angles of the hybrid platform. If the estimated accuracies reach specified values, the track/positional angles of the hybrid platform are set valid. Now highly precise track/positional angles are available, that have, however, due to using the GPS measurements a decreased integrity with respect to the initial state and that are hence not in compliance with the requirements.

To use the high precisions obtained in the hybrid system for the inertial navigation platform with high integrity the following approach is taken:

If the differences between hybrid and inertial track/positional angles are not larger than the allowed thresholds that are fixed for the integrity, the integrity at the time of comparing can be considered as ensured for the hybrid track/positional angles influenced by the GPS measurements. In this case, the inertial platform can be re-initialized with the highly precise track/positional angles of the hybrid platform. After this re-initialization highly precise track/positional angles are available to the inertial platform with the required integrity and the system can be transferred from operation as track/position reference system to the navigation mode.

Figure 2A:
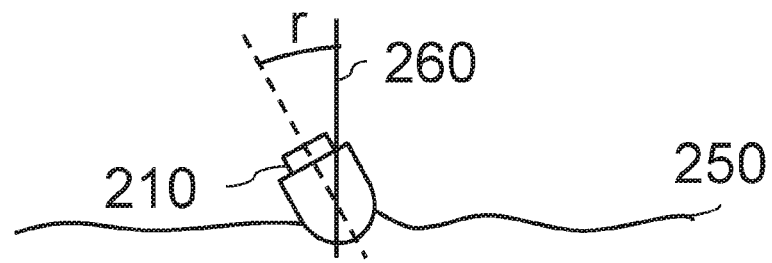
Figure 2B:
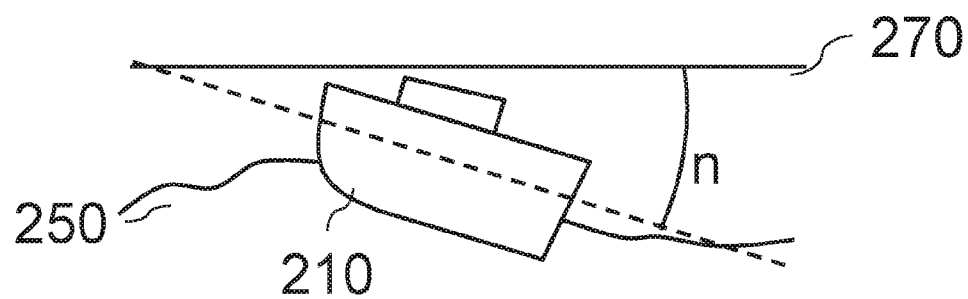
Figure 2C:
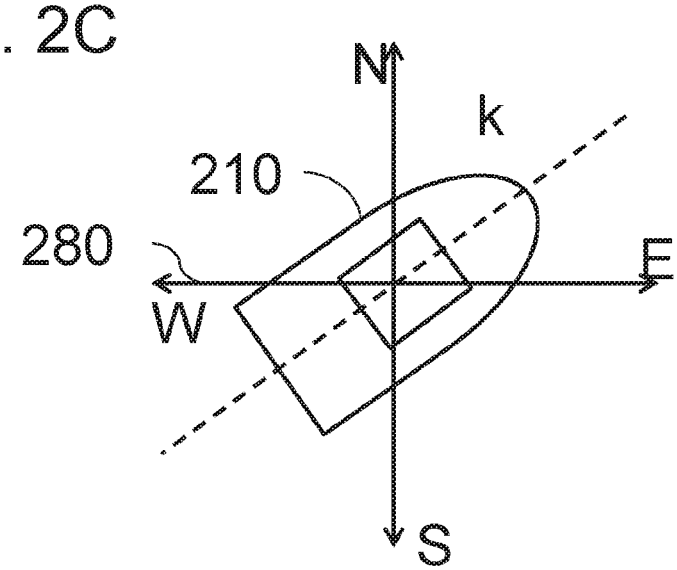
Figure 3:
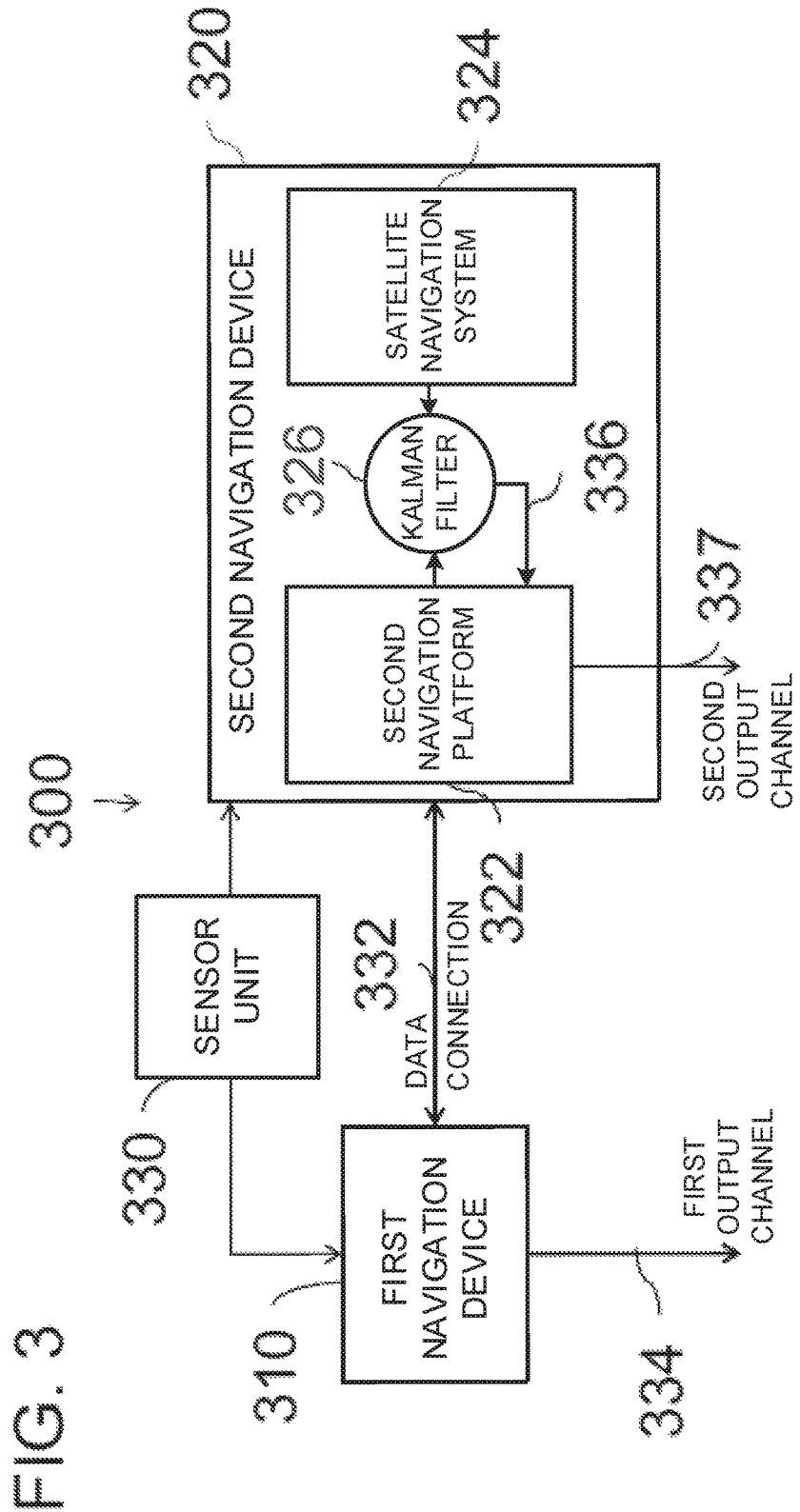

Based on embodiments the invention will be explained in what follows with reference to the figures. It show FIGS. 1A and 1B schematically navigation of watercrafts and aircrafts, FIG. 2A to 2C schematically the positional and track angles of a vehicle, FIG. 3 schematically a device for determining navigation data according to an embodiment, FIG. 4 a schematic process flow of a method for determining navigation data according to an embodiment.

Elements or element groups corresponding to each other are designated in the figures by the same reference signs.

Figure 1B:
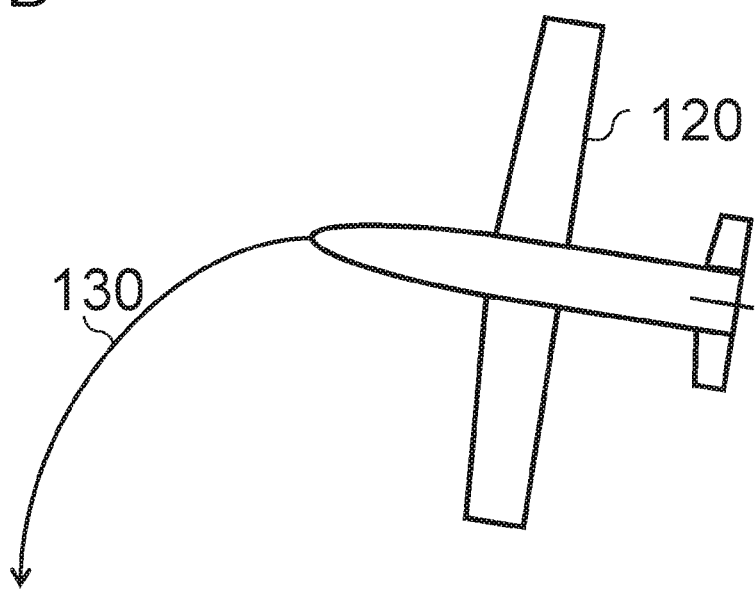

FIG. 1A shows a watercraft 110. The watercraft 110 may be any ship of any size. The watercraft may for example be a sport boat, a fisher boat, a yacht, a cruiser, a frigate, a battle ship or an aircraft carrier.

On the watercraft 110 an aircraft 120 may be present. The aircraft 120 may for example be a helicopter, an airplane or a rocket. According to an embodiment the watercraft 110 is a yacht and the aircraft 120 a helicopter.

The watercraft 110 navigates along a course 130. For determining the course 130 the watercraft comprises various navigation systems. By means of these navigation systems the watercraft 110 can determine its position (longitude and latitude), its orientation with respect to the North Pole (track angle), its inclination to the side (role angle), its frontward inclination (pitch angle) and its velocity.

The aircraft 120 is firmly connected to the watercraft 110 and has therefore the same position data. As navigation on water has to satisfy other requirements than navigation in air it is, however, necessary to provide the aircraft 120 during take-off from the watercraft 110 with navigation data that satisfy the requirements of aviation.

FIG. 1B shows the aircraft 120 on its course 130 after it has been separated from the watercraft 110. The aircraft 120 may according to a different embodiment also have started from a different place than the watercraft 110, for example from ground or from the surface of the water. According to an embodiment the aircraft 120 is an airplane.

The navigation data that are available to the aircraft 120 typically have to comply with strict requirements. In particular, the integrity of measurements that are carried out by navigation systems on board of the aircraft 120 must be sufficiently high in order to avoid an erroneous determination of position/orientation and hence dangerous situations.

As explained above for aviation and seafaring in particular the integrity of role angle and pitch angle (positional angles) as well as of the track angle is of importance, as these describe the orientation of the aircraft or watercraft 110, 120 in space.

Positional angles and track angles are illustrated in FIGS. 2A to 2C.

FIG. 2A illustrates the role angle r by means of a watercraft 210. The role angle r is a positional angle and describes the rotation of the transverse axis of the watercraft with respect to the horizontal. The role angle has positive sign, if the starboard side (right, if viewed in front direction) of the watercraft is inclined towards the water. Here, the rotation axis, which is perpendicular to the plane in which the role angle is measured, is inclined by the pitch angle with respect to the horizontal plane, i.e. the role angle measurement plane is not a vertical plane. The role angle r may be different from zero by maneuvers of the watercraft 210, due to uneven loads on the watercraft 210 or due to movement of the water 250.

FIG. 2B illustrates as further positional angle the pitch angle n. The pitch angle describes the rotation of the longitudinal axis of the watercraft with respect to the horizontal. The measurement plane of the pitch angle is the plane that contains the longitudinal axis of the watercraft and is perpendicular to the horizontal plane, it is hence a vertical plane. If the longitudinal axis of the watercraft viewed in front direction is above the horizontal plane, a positive pitch angle will be obtained. As for the role angle r the pitch angle n may be different from zero due to maneuvers of the watercraft 210, due to uneven loads on the watercraft 210 or due to movements of the water 250.

The positional angles of an aircraft are determined in analogous manner to the positional angles of the watercraft 210. For an aircraft the positional angles are determined substantially by maneuvers of the aircraft, but they may also depend on loads on the aircraft, on the density of air layers, and on occurring winds.

FIG. 2C illustrates the track angle k of the watercraft 210. The track angle k is the angle between the projection of the longitudinal axis of the watercraft carried out in the pitch measurement plane onto the horizontal plane and the geographic north direction defined in this plane. The track angle k is positive in eastward directions. The track angle of an aircraft is determined analogously to the track angle of the watercraft 210.

As described above it is not possible to initialize hybrid navigation platforms by means of data of weakly coupled satellite navigation system, such that a high integrity for determining of positional and track angles can be achieved, as the insufficiently high integrity of the satellite navigation system is transferred into the hybrid navigation platforms. Therefore, in particular for an aircraft starting from a watercraft, no sufficiently high integrity can be provided by means of a conventional hybrid navigation platform.

FIG. 3 shows schematically a device according to an embodiment that is suitable to solve this problem.

The device 300 comprises a first navigation device 310 and a second navigation device 320. To both navigation devices inertial measurement data such as acceleration data or rotation rates are supplied by a common sensor unit 330. All components of the device 300 are located together on an aircraft.

The sensor unit 330 comprises three rotation rate sensors and three acceleration sensors. The rotation rate sensor may be a mechanical gyroscope, a fiber optic rotation rate sensor, a laser gyroscope, or a micromechanical rotation rate sensor. As acceleration sensor a micromechanical sensor may be used.

The first navigation device 310 and the second navigation device 320 are configured to determine the track and positional angles of a vehicle. The vehicle may be a watercraft, an aircraft, or a land craft.

The first and the second navigation devices 310, 320 put out measurement values of the track and positional angles determined by them via a first output channel 334 and a second output channel 337. The measurement values determined by the first and the second navigation devices 310, 320 may for example be displayed to a driver of the vehicle. Further, the first and the second navigation devices 310, 320 are configured to exchange measurement values by means of a data connection 332.

According to an embodiment the first navigation device comprises a first navigation platform that determines track and positional angle measurement values by means of measurement values captured by the sensor unit 330.

The second navigation device 320 comprises a second navigation platform 322, a satellite navigation system 324 and a Kalman filter 326. The second navigation platform 322 may determine measurement values of the track and positional angles by means of measurement values that are captured by the sensor unit 330.

The satellite navigation system 324 determines the position and velocity of the vehicle by means of distant measurements to at least four satellites in Earth's orbit. The satellite navigation system 324 may be the global positioning system (GPS) or any other satellite navigation system such as e.g. Galileo, GLONASS or Compass.

The second navigation platform 322 and the satellite navigation system 324 transmit the measurement values for position and velocity determined by them to the Kalman filter 326. Based on the previously observed measurement values the Kalman filter 326 estimates the momentarily present errors of track and positional angles, position, velocity as well as the errors of the rotation rate and acceleration sensors. The correction values deduced in this process are supplied to the second navigation platform 322 via the connection 336. The thus corrected measurement values of the second navigation platform are output via the second output channel 337.

The first navigation device 310 or the first navigation platform, respectively, determines track and positional angle measurement values for the vehicle. In this process, the first navigation device 310 has an integrity that is larger than a predetermined positional angle integrity, i.e. erroneous measurements of the positional angle measurement values determined by the first navigation device 310 occur with a probability that is smaller than a predetermined positional angle error rate. The predetermined positional angle error rate may be $10^{-9}$ per hour in this process.

The second navigation device 320 determines independently from the first navigation device 310 positional angle measurement values for the vehicle based on the initialization with the positional angle measurement values of the first navigation device 310. Here, due to the measurement data of the satellite navigation system 324 and due to the Kalman filter 326 the accuracy of the measurement data increases continuously. Simultaneously, the integrity of the second navigation device 320 decreases due to the influence of the measurement values of the satellite navigation system 324.

The second navigation device 320 has therefore a lower integrity than the first navigation device 310. The second navigation device 320 generates erroneous measurements of the positional angle measurement values with the probability that is larger than the predetermined positional angle error rate.

Erroneous measurements of the positional angle measurement values occur, if one of the positional angle measurement values deviates by more than a predetermined positional angle tolerance value from a positional angle reference value. The positional angle reference value may be the actual value of the positional angle or may be a value of the positional angle estimated and interpolated from previous measurement values.

The positional angle tolerance value may be adapted according to the situation. For example, the positional angle tolerance value during approach for landing or during start of an aircraft may be lower than during the flight in great heights. The positional angle tolerance value may also be predetermined and/or constant. The positional angle tolerance value may be between 4° and 5°.

The first navigation device 310 may determine also track angle measurement values for the vehicle. The first navigation device 310 may determine the track angle measurement values by means of the first navigation platform. The first navigation device 310 may determine the track angle measurement values before or after determining the positional angle measurement values or also simultaneously with determining the positional angle values.

The first navigation device 310 has in this process an integrity that is larger than a predetermined track angle integrity, i.e. erroneous measurements of the track angle measurement values determined by the first navigation device 310 occur with a probability that is smaller than a predetermined track angle error rate. The predetermined track angle error rate may be $10^{-7}$ per hour in this process.

Erroneous measurements of the track angle measurement values occur, if the track angle measurement value deviates by more than a predetermined track angle tolerance value from a track angle reference value. The track angle reference value may be the actual value of the track angle.

The track angle tolerance value may be adapted according to the situation. For example, the track angle tolerance value during free flight may be larger than during approach for landing. The track angle tolerance value may also be predetermined and/or constant and may be e.g. 10°.

The track angle measurement value of the first navigation device 310 may also be initialized with a magnetic sensor such as for example a magnetic compass. The track angle measurement values may also be initialized by hand. The predetermined track angle error must not be exceeded in this process.

Via the data connection 332 the positional angle measurement values and the track angle measurement value are transferred to the second navigation device 320. The second navigation device 320 is then initialized with these measurement values. This guarantees that the second navigation device 320 is initialized with measurement values that satisfy the higher integrity requirements that cannot be provided by the second navigation device 320 itself.

After the second navigation device 320 has been initialized with the measurement values of the first navigation device 310, the second navigation device 320 determines track and positional angle measurement values. To this end, the vehicle, preferably an aircraft, on which the second navigation device 320 is located, must be acceleratedly moved to excite the error estimation of the Kalman filter 326. The accelerated movement may be provided by maneuvers of the ship on which the aircraft is stationary located or by aircraft movements of the started aircraft.

While track and positional angle measurement values are determined by the first navigation device 310 also the second navigation device 320 determines track and positional angle measurement values. The convergence of the Kalman filter 326 is recognizable by means of the variance of the estimated errors. If the estimated accuracies of the errors are below predefined thresholds, a stable state is achieved and the positional angle measurement values and the track angle measurement values of the second navigation device 320 are set to be valid.

To allow re-initialization of the first navigation device 310 under use of the now more precise track and positional angle measurement values of the second navigation device 320 the determined angular measurement values of the first and the second navigation devices 310, 320 are compared. In order to guarantee a high quality of the position determination as well as also a high integrity of the positional and track angles, a re-initialization of the first navigation device 310 and a transfer of the first navigation device 310 into the navigation mode based on the measurement values determined by the second navigation device 320 is only allowed, if the deviation of the angular measurement values determined by the first and the second sensor devices 310, 320 is within the angular tolerance values defined by the integrity requirements.

This allows transferring of the high integrity of the first sensor device 310 to the highly precise measurement values of the second navigation device 320 at the time of this check or monitoring. The more precise measurement values of the second navigation device 320 are therefore suitable for re-initialization of the first navigation device 310 without losing its high integrity.

According to an embodiment a device located on the aircraft 120 and consisting of a first navigation device 310 and a second navigation device 320 is started after starting the aircraft 120 as illustrated in FIG. 1A, which is located on the watercraft 110. The second navigation device 320 imports the positional angle measurement values from the first navigation device 310.

While the first navigation device 310 determines angular measurement values for the first time, the aircraft 120 and the watercraft 110 are in rest and not exposed to accelerations. The device 300 located on the aircraft may, however, also be exposed to such accelerations that cancel in the temporal mean. This could for example be movements of the watercraft 110 that are caused by the sea.

After transferring the measurement values of the first navigation device 310 to the second navigation device 320 and initializing of the second navigation device 320 with these measurement values, the aircraft 120 can start. In this process, the track and positional angle determination is initially carried out by means of the first navigation device 310 that determines further angular measurement values, while the second navigation device 320 determines continuously track and positional angle measurement values.

The angular measurement values determined in this process by the first and the second navigation devices 310, 320 are compared to check the validity of the positional and track angle measurement values of the second navigation device 320. In order to guarantee a high quality of the position determination as well as also a high integrity, navigation of the aircraft 120 based on the measurement values determined by the second device 320 is only then allowed, if the deviation of the angular measurement values determined by the first and the second navigation devices 310, 320 is within the angular tolerance values defined by the integrity requirements. The positional angle tolerance values may e.g. be between 4° and 5°. The track angle tolerance value may be e.g. 10°. Also other tolerance values may be set.

After full functioning of the second navigation device 320 is ensured due to agreement of the positional angle measurement values determined from the first navigation device 310 and the second navigation device 320 within the positional angle tolerance values, the first navigation device 310 is re-initialized with the measurement values of the second navigation device 320 via the data connection 332.

For further provision of track angle and positional angles for critical functions of the aircraft 120 in the air, the measurement values of the first navigation device 310 are used after re-initialization by means of the measurement values of the second navigation device. The second navigation device 320 continuous to determine measurement values, which may be used e.g. for navigation that is less critical than the track angle and the positional angles.

According to a further embodiment the functions of the first and the second navigation platforms as well as of the Kalman filter 326 are carried out by a computer processor such as for example a CPU. Here, the functions of the first and the second navigation platform may be implemented by the same software or hardware. Then, the first and the second navigation platform are the same. This leads to reduction of elements and hence to saving space and costs.

Figure 4:
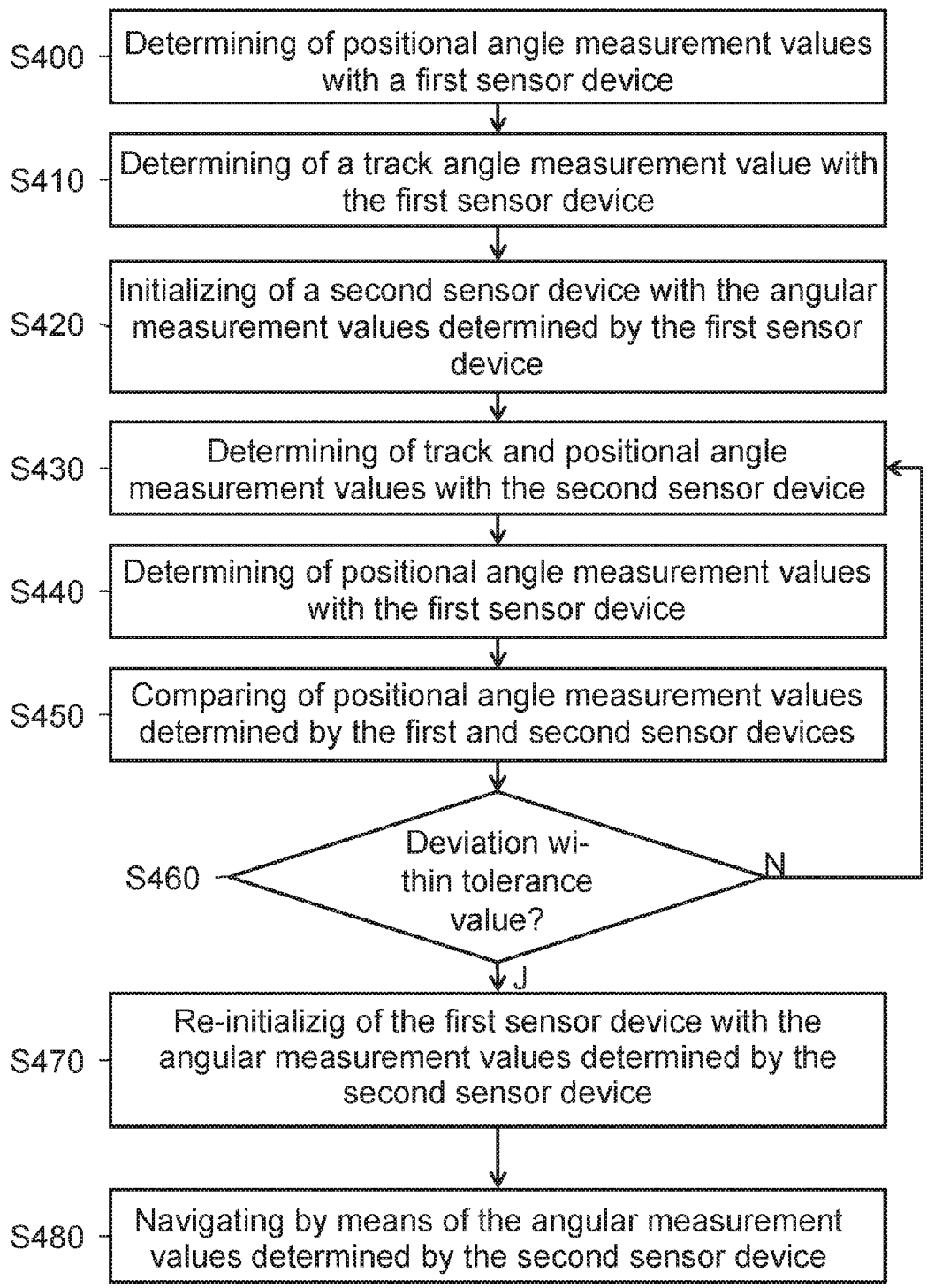

FIG. 4 illustrates a process flow of a method for determining navigation data according to an embodiment.

In step S400 positional angle measurement values and track angle measurement values are determined with a first navigation device 310. The track angle measurement values may also be determined with the first navigation device 310 by a gyro compassing method or a magnetic sensor such as a magnetic compass, or even manually.

In step S420 a second navigation device 320 is initialized with the angular measurement values determined by the first navigation device 310.

In this process, the first navigation device 310 has an integrity that is larger than a predetermined positional angle integrity, i.e. erroneous measurements of the positional angle measurement values determined by the first navigation device 310 occur with a probability that is smaller than a predetermined positional angle error rate. The predetermined positional angle error rate may be $10^{-9}$ per hour in this process. The second navigation device 320 has a lower integrity than the first navigation device 310. The second navigation device 320 generates erroneous measurements of the positional angle measurement values with a probability that is larger than the predetermined positional angle error rate.

Erroneous measurements of the positional angle measurement values occur, if one of the positional angle measurement values deviates by more than a predetermined positional angle tolerance value from a positional angle reference value. The positional angle reference value may be the actual value of the positional angle or a value of the positional angle estimated and interpolated from previous measurement values.

The positional angle tolerance value may be adapted according to the situation and be e.g. between 4° and 5°.

In step S430 the second navigation device 320 determines continuously track and positional angle measurement values after it has been initialized. To this end, it uses the measurement values of a satellite navigation system in order to increase the accuracy.

In step S440 track and positional angle measurements are continuously determined with the first navigation device 310.

In step S450 the positional angles determined by the first and the second navigation devices 310, 320 are compared after the required accuracy of the second navigation device 320 (i.e. the Kalman filter 326 is fully operating) has been obtained.

In step S460 it is checked whether the deviation of the determined positional angle measurement values from each other is below the positional angle tolerance value. If this is not the case (N), steps S430 to S460 are repeated.

If the values of the deviations of the determined positional angle measurement values from each other are below the predetermined positional angle tolerance values (J), the first navigation device 310 is re-initialized with the track and positional angle measurement values determined by the second navigation device 320.

In step S480 track and positional angle determination and navigation is carried out by the re-initialized first navigation device 310 and measurement values for critical functions of the aircraft are provided. The second navigation device provides further track and positional angle measurement values for uncritical aircraft functions.

By means of the method described above navigation data can be determined that satisfy strict requirements on the integrity and the positional angle, track angle and position accuracy.

The invention claimed is:

1. A method for determining navigation data, comprising:
    determining positional angle measurement values with a first navigation device; and
    initializing a second navigation device with the positional angle measurement values determined by the first navigation device, wherein
    rotation rate and acceleration measurement values for determining the positional angle measurement values are supplied to the first navigation device and the second navigation device from a sensor unit; wherein
    the first navigation device carries out erroneous measurements of the positional angle measurement values with a probability that is smaller than a predetermined positional angle error rate;
    the second navigation device carries out erroneous measurements of the positional angle measurement values with a probability that is larger than the predetermined positional angle error rate;
    an erroneous measurement of the positional angle measurement values occurs when one of the determined positional angle measurement values deviates by more than a predetermined positional angle tolerance value from a respective positional angle reference value; and
    no erroneous measurement of the positional angle measurement values occurs when none of the determined positional angle measurement values deviates by more than the predetermined positional angle tolerance value from the respective positional angle reference value.

2. The method according to claim 1, further comprising:
    determining a track angle measurement value simultaneously to determining the positional angle measurement value,
    initializing the second navigation device with the positional angle measurement values and the track angle measurement values determined by the first navigation device, wherein
    erroneous measurements of the track angle measurement value occur with a probability that is smaller than a predetermined track angle error rate;
    an erroneous measurement of the track angle measurement value occurs when the determined track angle measurement value deviates by more than a predetermined track angle tolerance value from a respective track angle reference value; and
    no erroneous measurement of the track angle measurement value occurs when the determined track angle measurement value does not deviate by more than the predetermined track angle tolerance value from the respective track angle reference value.

3. The method according to claim 2, wherein the track angle measurement value is determined by the first navigation device, by a magnetic sensor or by a manual input.

4. The method according to claim 1, further comprising:
    determining positional and track angle measurement values with the second navigation device temporarily after initializing the second navigation device with the positional angle measurement values determined by the first navigation device;
    determining of positional angle measurement values with the first navigation device during determining track and positional angle measurement values with the second navigation device;
    comparing the positional angle measurement values determined by the first navigation device and the second navigation device, wherein
    if the determined positional angle measurement values deviate from each other by less than the predetermined positional angle tolerance value,
    then, re-initialization of the first navigation device with the positional and track angle measurement values determined by the second navigation device; and
    then, navigating based on the positional and track angle measurement values determined by the second navigation device.

5. The method according to claim 1, wherein
    the first navigation device comprises a first navigation platform; and
    the second navigation device comprises a second navigation platform, a satellite navigation system, and a Kalman filter, which couples the data of the second navigation platform and the satellite navigation system.

6. The method according to claim 5, wherein the first navigation platform and the second navigation platform are the same.

7. The method according to claim 1, wherein the first and the second navigation devices as well as the sensor unit are not accelerated during determining of the angles for the first time, or the first and the second navigation devices as well as the sensor unit are accelerated during determining of the angles for the first time such that a temporal average of the accelerations cancel.

8. A device for determining navigation data, comprising:
    a first navigation device for determining positional angle measurement values;
    a second navigation device for determining positional angle measurement values, the second navigation device being initialized with positional angle measurement values determined by the first navigation device; and a sensor unit that supplies rotation rate and acceleration measurement values for determining the positional angle measurement values to the first navigation device and the second navigation device, wherein the first navigation device carries out erroneous measurements of the positional angle measurement values with a probability that is smaller than a predetermined positional angle error rate;

the second navigation device carries out erroneous measurements of the positional angle measurement values with a probability that is larger than a predetermined positional angle error rate; and wherein an erroneous measurement of the positional angle measurement values occurs when one of the determined positional angle measurement values deviates by more than a predetermined positional angle tolerance value from a respective positional angle reference value, and no erroneous measurement of the positional angle measurement values occurs when none of the determined positional angle measurement values deviates by more than the predetermined positional angle tolerance value from the respective positional angle reference value.

9. The device according to claim 8, wherein the first navigation device is configured to determine a track angle measurement value temporarily after determining the positional angle measurement value;

the second navigation device is configured to be initialized with the angular measurement values determined by the first navigation device;

erroneous measurements of the track angle measurement value occur with a probability that is smaller than a predetermined track angle error rate;

erroneous measurements of the track angle measurement value occurs when the determined track angle measurement value deviates by more than a predetermined track angle tolerance value from a respective track angle reference value; and no erroneous measurements of the track angle measurement value occur when the determined track angle measurement value does not deviate by more than the predetermined track angle tolerance value from the respective track angle reference value.

10. The device according to claim 8, wherein the second navigation device is configured to determine positional angle and track angle measurement values temporarily after initializing the second navigation device with the positional angle measurement values determined by the first navigation device;

the first navigation device is configured to determine the positional angles during determining the positional angles and the track angle with the second navigation device;

the first navigation device and the second navigation device are configured to compare the determined values of the positional angles; and wherein if the determined positional angle measurement values deviate by less than the predetermined positional angle tolerance value from each other, then, the first navigation device is configured to be re-initialized with the positional and track angle measurement values determined by the second navigation device; and then, the second navigation device is configured to navigate based on the positional and track angle measurement values determined by the second navigation device.

11. The device according to claim 8, wherein the first navigation device comprises a first navigation platform; and the second navigation device comprises a hybrid navigation platform with a second navigation platform, a satellite navigation system and a Kalman filter, which couples the data of the second navigation platform and the satellite navigation system.

\* \* \* \* \*